| United States Patent [19] | [11] Patent Number: 4,612,125 |
| Elfline | [45] Date of Patent: Sep. 16, 1986 |

[54] METHOD FOR REMOVING HEAVY METAL FROM WASTEWATER STREAMS

[75] Inventor: Geraldine S. Elfline, Morrison, Ill.

[73] Assignee: CX/Oxytech, Inc., Yorkville, Ill.

[21] Appl. No.: 747,008

[22] Filed: Jun. 20, 1985

[51] Int. Cl.$^4$ ............................................. C02F 1/52
[52] U.S. Cl. .................................. 210/724; 210/726; 210/912; 423/34; 423/92; 423/101
[58] Field of Search ............... 210/723, 724, 719, 726, 210/912–914; 423/92, 101, 105, 34, 428, 35

[56] References Cited

U.S. PATENT DOCUMENTS

| 3,879,525 | 4/1975 | Miyata et al. | 423/311 |
| 3,966,601 | 6/1976 | Stevenson et al. | 210/710 |
| 4,166,032 | 8/1979 | Hanway, Jr. et al. | 210/675 |
| 4,425,230 | 1/1984 | Andress et al. | 209/167 |
| 4,459,237 | 7/1984 | Bresson et al. | 209/167 |

FOREIGN PATENT DOCUMENTS

| 0116988 | 8/1984 | European Pat. Off. | |
| 47-25088 | 10/1972 | Japan | 210/913 |
| 56-168881 | 12/1981 | Japan | 210/735 |

*Primary Examiner*—Peter Hruskoci
*Attorney, Agent, or Firm*—Mason, Kolehmainen, Rathburn & Wyss

[57] ABSTRACT

A method for removing heavy metals from wastewater streams removes such heavy metal by treating heavy metal-containing wastewater with a water soluble tri-thio carbonate, particularly an alkali metal tri-thio carbonate, such as sodium tri-thio carbonate ($Na_2CS_3$) to precipitate heavy metals therefrom.

4 Claims, No Drawings

METHOD FOR REMOVING HEAVY METAL FROM WASTEWATER STREAMS

FIELD OF THE INVENTION

The present invention is directed to a method for removing heavy metals from wastewater streams and, more particularly to a method for treating a heavy metal-containing wastewater with a water soluble tri-thio carbonate, particularly an alkali metal tri-thio carbonate such as sodium tri-thio carbonate ($Na_2CS_3$) to precipitate heavy metals therefrom.

BACKGROUND OF THE INVENTION AND PRIOR ART

The metals plating and finishing industry has been moving to a "zero-discharge" basis for disposal of metal-bearing wastewater streams. Progressively stricter regulatory criteria have forced industry to reduce drastically the residual metal contents in wastewater discharges and, in some instances at least, allowable residuals are approaching the limit of detection afforded by available analytical techniques. Further, the economic benefit of "zero-discharge" for recycle of clean and wastewater effluents to process applications and metals recovery is an attractive goal, particularly for reduction of water costs and sewer use charges.

The ability of conventional wastewater treatment methods to achieve the low levels of residual metals required by the higher standards for wastewater purity in many cases is marginal. In addition, most conventional methods of heavy metals removal produce copious amounts of sludge, usually classified a priori as a hazardous material. Recent legislation has made the disposal of sludge material extremely difficult and expensive and no near term solution to the sludge disposal problem seems apparent.

Because of these problems, industry in general, and the metal plating and finishing segments in particular, have been forced to consider alternative methods for heavy metals removal from wastewater streams. The major characteristics needed in heavy metals removal from wastewater streams are: ability to reduce residual metal contents to extremely low levels (ultimately to the parts-per-billion range); production of minimal amounts of sludge; economic operation; production of an effluent suitable for recycle to process operations; and ability for maximum retrofit into existing installations.

One of the more promising new alternative approaches that possesses the potential of fulfilling to a significant degree these desirable requirements for treating metallic-bearing wastewaters is xanthate technology. A patent to John Hanway, U.S. Pat. No. 4,166,032, discloses the use of cellulose xanthate for heavy metals removal from wastewater streams. While cellulose xanthate is very effective for removal of heavy metals from wastewater, the cellulose xanthate becomes loaded with heavy metals periodically and must be disposed of. In accordance with the present invention, it has been found that water soluble tri-thio carbonates, and particularly alkali metal tri-thio carbonates or alkaline earth tri-thio carbonates effectively precipitate heavy metals from wastewaters leaving a substantially non-polluted solution or effluent capable of plant recycle or legal discharge.

SUMMARY OF THE INVENTION

In brief, the present invention is directed to a method for treating a heavy metal containing wastewater stream, particularly a wastewater stream from the metals plating or finishing industry, with a water soluble tri-thio carbonate to precipitate the heavy metals for separation from the wastewater.

Accordingly, an object of the present invention is to provide a method for treating metal-bearing wastewaters to cause precipitation of a substantial portion of the metals therefrom.

Another object of the present invention is to provide a method for treating heavy metal bearing wastewaters with a water soluble tri-thio carbonate, and particularly an alkali metal tri-thio carbonate.

Still another object of the present invention is to provide a method for removing heavy metals from an aqueous wastewater stream while avoiding concomitant formation of residual sludge.

Yet another object of the present invention is to provide a method for treating heavy metal-bearing wastewater streams with an alkali metal or alkaline earth metal tri-thio carbonate solution to remove sufficient heavy metals for recycle of the treated wastewater effluent to an industrial process without requiring disposal of a heavy metal loaded xanthate waste product.

DETAILED DESCRIPTION OF THE PREFERRED EMBODIMENTS

In accordance with the principles of the present invention, residual metal contents in the low parts-per-million range may be obtained by mixing a water soluble tri-thio carbonate, and particularly one or more alkali metal or alkaline earth tri-thio carbonates into the metal-containing wastewater.

Tri-thio Carbonates

The tri-thio carbonate compound can be any water soluble tri-thio carbonate where the cation is not polluting or toxic in solution. Suitable water soluble tri-thio carbonates include one or more alkali metal or alkaline earth tri-thio carbonates.

The alkali metal and alkaline earth metal tri-thio carbonates are water soluble and provide the tri-thio carbonate anion $CS_3^=$ in solution capable of reaction with heavy metals such as Pb, Zn and Cu, Fe and Cr to produce a heavy metal tri-thio carbonate precipitate $MCS_3$ where M is a heavy metal and x is an integer of 1 or 2, and a non-polluted effluent. The most suitable tri-thio carbonates are the Na, K, Li, Mg and Ca tri-thio carbonates.

Some alkali metal and alkaline earth metal tri-thio carbonates are commercially available in pure form, such as sodium tri-thio carbonate ($Na_2CS_3$), but pure forms of the alkali metal tri-thio carbonates are not necessary to their efficacy in precipitating heavy metals from wastewaters. For example, alkali metal tri-thio carbonates can be formed by reacting carbon disulfide with an alkali metal hydroxide to produce a reactive solution of alkali metal tri-thio carbonate and alkali metal carbonate, in accordance with the following equation:

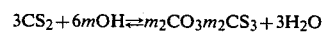

where m is any alkali metal or alkaline earth metal. The alkali metal or alkaline earth metal tri-thio carbonate is soluble in water, does not disturb the precipitation reaction and does not pollute the effluent solution. The concentration of the metal tri-thio carbonate is not critical so long as a sufficient molar amount is provided for reaction with the molar (atomic) amount of heavy metals in solution. The 100% solubility of the alkali and alkaline earth metal tri-thio carbonates is less than about 50% by weight of the solution so that the precipitating solution of alkali metal and alkaline earth metal tri-thio carbonates is generally 20–50% by weight. However, tri-thio carbonate compounds in a concentration of about 0.1% by weight minimum up to the extent of solubility can be employed in accordance with the principles of the present invention.

As is well known in the art of removing heavy metals from wastewater, an initial raising of the wastewater pH to a level above 7.0 and preferably at least 7.5 causes precipitation of the majority of the heavy metals in solution as metal hydroxides. The chemical and physical characteristics of this precipitate, however, are not conducive to easy separation since the metal hydroxides are somewhat gelatinous and slippery.

In accordance with an important feature of the present invention, contact of the wastewater with a water soluble tri-thio carbonate creates a heavy metal tri-thio carbonate precipitate $M_xCS_3$, as described above, which is in the form of larger molecule in solid form, easy to separate and dewater from the effluent such as by filtration through any suitable physical filtration medium. Further, in accordance with another important feature of the present invention, the precipitated metals are in a form capable of thermal or chemical treatment for recovery of relatively pure heavy metals for recycling in the industrial process which caused their contamination in the wastewater, or elsewhere.

EXAMPLES

A wastewater stream having a pH of 3.5 was examined for content of copper, lead and zinc using atomic absorption and found to contain 14.25 mg/liter Cu, 13.73 mg/liter lead and 14.79 mg/liter zinc.

The wastewater was separated into 100 ml. portions and the pH of each portion of the wastewater was raised by the addition of 20% by weight NaOH to a pH of 7.8. After pH adjustment, the solution was analyzed again using atomic absorption and found to contain 0.90mg/l. copper, 1.98 mg/l. lead and 4.82 mg/l. zinc. The precipitate from each 100 ml. portion was bluish and slippery.

Celluose Xanthate (prior art) Treatment

Three of the above-described pH adjusted (pH 7.8) wastewater portions were treated with different amounts ($A_1$-0.12 gms; $B_1$-0.23 gms and $C_1$-0.45 gms) of cellulose xanthate from one supplier and three of the portions treated with a cellulose xanthate ($A_2$-0.12 gms, $B_2$-0.23 gms and $C_2$-0.45 gms) from another supplier. The effluent of each portion was analyzed using atomic absorption with the following results:

| Example | Cu(mg/l.) | Pb(mg/l.) | Zn(mg/l.) |
| --- | --- | --- | --- |
| $A_1$ | .10 | 1.10 | 1.59 |
| $B_1$ | DL* | .90 | .40 |
| $C_1$ | DL* | .78 | .24 |
| $A_2$ | 1.00 | 2.19 | 1.51 |
| $B_2$ | .65 | 1.65 | 1.13 |
| $C_2$ | .64 | 1.24 | .76 |

*less than the detectable limits of the atomic absorption device

Tri-Thio Carbonate Treatment

The remaining three portions of the pH adjusted wastewater then were treated with varying amounts of a solution of sodium tri-thio carbonate and sodium carbonate formed by reaction of 10 ml. of $CS_2$ with 100 ml of 20% by weight NaOH in accordance with the equation $3CS_2 + 6NaOH \rightleftharpoons Na_2CO_3 + 2Na_2CS_3 + 3H_2O$. The concentration of the sodium tri-thio carbonate and sodium carbonate solution was not determined. The example designated A3 was performed by using 1 ml. of the reaction product solution to achieve a final pH of 11.2; the example designated B3 was performed by mixing 2 ml of the reaction product solution to achieve a final pH of 11.7; and the example designated C3 was performed by mixing 3 ml of the reaction product solution into the pH adjusted wastewater solution to achieve a final pH of 12.0. The following results were found by using atomic absorption:

| Example | Cu(mg/l) | Pb(mg/l) | Zn(mg/l) |
| --- | --- | --- | --- |
| $A_3$ | DL* | 1.77 | .08 |
| $B_3$ | DL* | 2.00 | .13 |
| $C_3$ | DL* | .95 | .17 |

*less than the detectable limits of the atomic absorption device.

The tri-thio carbonate further reacted with the precipitate on the bottom of the beakers, formed by the NaOH pH adjustment to increase the molecular size of the precipitate and form a larger, brown, hard metallic form of precipitate. The precipitate was easily separated from the effluent by pouring the effluent through a filter membrane. Further, the sodium tri-thio carbonate outperformed the cellulose xanthate for precipitation of copper and zinc and there was no sludge and no cellulose by-product to dispose of.

What is claimed and desired to be secured by Letters Patent of the United States is:

1. A method of treating a heavy metal-bearing wastewater to remove a substantial portion of the heavy metal therefrom without substantial sludge formation comprising:

contacting said wastewater with a water soluble tri-thio carbonate in an amount sufficient to react with said heavy metal and cause precipitation of a substantial portion of the heavy metals in the wastewater, and separating the percipitate from the wastewater.

2. The method of claim 1 wherein the water soluble tri-thio carbonate is an alkali metal or alkaline earth metal forming tri-thio carbonate selected from the group consisting of $Na_2CS_3$, $Mg_2CS_3$, $CA_2CS_3$, $Li_2CS_3$ and $K_2CS_3$.

3. The method of claim 2 wherein the metal tri-thio carbonate is $Na_2CS_3$.

4. The method of claim 1 including raising the pH of the wastewater above 7.0 prior to containing the wastewater with the alkali metal tri-thio carbonate.

* * * * *